US009004846B2

(12) United States Patent
La Rovere et al.

(10) Patent No.: US 9,004,846 B2
(45) Date of Patent: Apr. 14, 2015

(54) GRIPPER ASSEMBLY FOR MOVING DEVICE (75) Inventors: Stefano La Rovere, Auderghem (BE);
Jia-wei Chiu, Frankfurt a.M. (DE);
Andreas Boettcher, Wallduern (DE);
Jeffrey Kyle Werner, Liberty Township, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 252 days.

(21) Appl. No.: 13/353,357

(22) Filed: Jan. 19, 2012

(65) Prior Publication Data
US 2012/0207574 A1  Aug. 16, 2012

Related U.S. Application Data (63) Continuation-in-part of application No. 13/025,185, filed on Feb. 11, 2011.

(51) Int. Cl.
*B66C 1/00* (2006.01)
*B66C 3/00* (2006.01)
*B25J 15/06* (2006.01)
*B25J 15/00* (2006.01)

(52) U.S. Cl.
CPC ............. *B25J 15/0616* (2013.01); *B25J 15/00* (2013.01)

(58) Field of Classification Search
USPC ......... 414/737–738, 732, 752.1, 680; 294/65, 294/87.1, 183, 192
See application file for complete search history.

(56) References Cited

U.S. PATENT DOCUMENTS 2,626,038 A * 1/1953 Smith ........................ 198/418.3
4,065,001 A * 12/1977 Ohnaka ........................ 414/733
4,744,595 A * 5/1988 Tonning et al. ................. 294/65
4,865,375 A  9/1989 Laub et al.
(Continued)

FOREIGN PATENT DOCUMENTS

DE  10012081 A1  11/2001
DE  10128185 A1  12/2002
(Continued)

OTHER PUBLICATIONS

U.S. Appl. No. 13/025,185, filed Feb. 11, 2011, Stefano LaRovere et al.
(Continued)

*Primary Examiner* — Stephen Vu
(74) *Attorney, Agent, or Firm* — Jeffrey V Bamber; Kim W Zerby (57) ABSTRACT

A gripper assembly for use with a moving device is disclosed. The moving device can be a mechanical device such as a robot. The gripper assembly includes a platform and an elongate arm extending from the platform. The elongate arm is in the form of least one elongate member. Each elongate member has a body which has a proximal end and an opposed distal end. A gripping mechanism is rotatably supported relative to the arm, and includes a holder having a pivoting arm pivotably joined to the body in the region of the distal end of the body. An actuator is in operable communication with the pivoting arm to impart pivotable movement to the pivoting arm and rotational movement to said gripping mechanism about a horizontal axis upon actuation of the actuator. The gripper assembly may have a center of mass substantially aligned with a vertical rotation axis of the gripper assembly.

11 Claims, 6 Drawing Sheets (56) References Cited

U.S. PATENT DOCUMENTS

| | | | | |
|---|---|---|---|---|
| 5,988,718 | A | * | 11/1999 | Sugimoto et al. ............... 294/65 |
| 2002/0136626 | A1 | * | 9/2002 | Herbermann et al. ........ 414/737 |
| 2004/0052626 | A1 | | 3/2004 | Oem et al. |
| 2005/0232740 | A1 | | 10/2005 | Cummings |
| 2008/0247857 | A1 | | 10/2008 | Yuasa et al. |
| 2009/0003983 | A1 | | 1/2009 | Tanaka et al. |
| 2012/0205928 | A1 | | 8/2012 | La Rovere et al. |

FOREIGN PATENT DOCUMENTS

| | | |
|---|---|---|
| DE | 102007062534 A1 | 6/2009 |
| FR | 2566881 A1 | 12/1985 |
| JP | 07-116984 A | 5/1995 |
| JP | 9-142411 | 6/1997 |
| JP | 11123687 A | 5/1999 |
| JP | 2001-328088 | 11/2001 |
| JP | 2009-543704 | 12/2009 |
| WO | WO 2010/108520 A1 | 9/2010 |

OTHER PUBLICATIONS

International Search Report dated Apr. 3, 2012, 4 pages.

All Office Actions, U.S. Appl. No. 13/025,185.

* cited by examiner

GRIPPER ASSEMBLY FOR MOVING DEVICE

CROSS REFERENCE TO RELATED APPLICATIONS

This application is a continuation-in-part of U.S. patent application Ser. No. 13/025,185, filed Feb. 11, 2011.

FIELD OF THE INVENTION

The invention is directed to a gripper assembly for use with a moving device, such as a mechanical device. In some embodiments, the gripper assembly may be used for robotic or mechanical picking and placing articles, containers, devices and other objects from a conveyance device for subsequent treatment thereof at one or more treatment stations along a production line.

BACKGROUND OF THE INVENTION

A variety of robot configurations currently perform various tasks at manufacturing sites. Among these tasks are the picking and placing of objects that are delivered to an initial conveyance device (such as a conveyor belt) upon which the articles may be initially in various random orientations ("initial article picking position"). Known devices for picking and placing articles (hereinafter "pickers") are entrusted with the task of picking up such articles and re-orienting them into a position ("article placement position") where each article is properly positioned for at least one subsequent treatment at one or more treatment stations located within a production facility.

Pickers that arrange articles from an initial position to any successive position typically include a robotic arm having a moveable end-effector that is connected to a gripper. A programmable controller moves the robotic arm and gripper to the article, picks up the article by controlling the gripper, moves the robotic arm to at least one successive position and releases the article by controlling the gripper. The robotic arm may, for instance, place the article into a conveyable position for conveyance on a running belt, a vacuum-conveyer, a neck-conveyer or other conveyance means. Alternatively, the robotic arm may place the article into a receptacle with like articles to effect grouping of like articles prior to further processing. For instance, it may place like articles on a pallet for placement of identifying article bar codes on the articles and/or the pallet. In typical configurations, the gripper includes a pick-up mechanism for picking and placing an article. The mechanism may be one of many kinds of tools known to those skilled in the art such as, for example, a magnetic device, a vacuum or suction device, a mechanical device or any other known device, depending on the characteristics of the article to be picked and placed. Once the gripper has picked up the targeted articles, the mechanical device with the gripper moves the items into the desired position and releases the items.

In consideration of the need for pickers to work within a real three-dimensional environment, enhancement to gripping technique can enhance the pickers' ability to accomplish tasks efficiently. Changes to configurations need to account for safe manipulation of an article in the manipulation space (that is, the area necessary to manipulate the object) and the manipulation cost (that is, the necessary time to finish the manipulation). In certain applications, it, therefore, desirable to bring an article from a relatively unknown position and orientation to a known orientation (but possibly unknown position) with minimal means. Assuming an article of an undetermined geometry assumes an initial position in a random configuration and the only force acting on it is gravity, considering the geometry and mass of the article, a robotic arm with a camera could detect the current article picking orientation, pick up the article and then put it in the "proper" article placement position. This approach can be costly if a high throughput is necessary, and, with current gripper configurations, it may be necessary to re-grip an article in order to successfully get it between the article picking and article placement positions.

Figure 1:
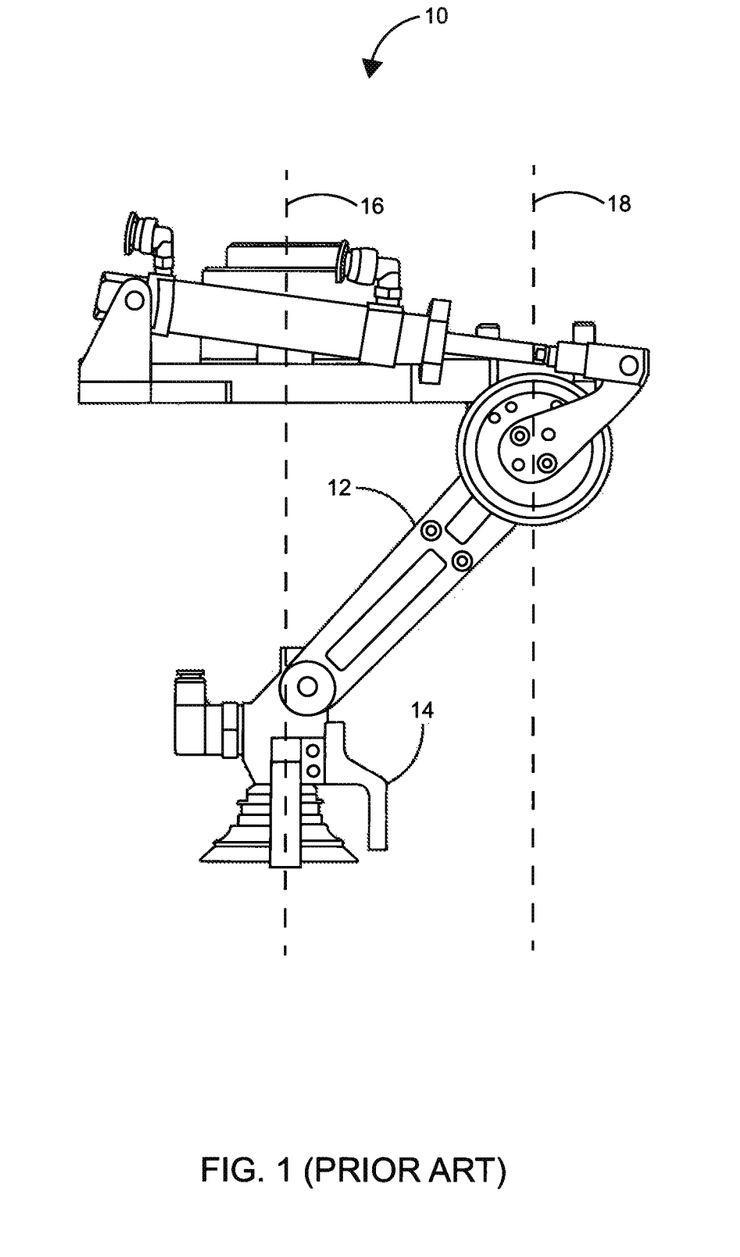
FIG. 1 is a perspective view of an industry standard gripper assembly.

Original commercial gripper designs addressed this by providing a double-rotation configuration to overcome inherent risks in relation to inertia and article height that were experienced in traditional 90° turning tools. During the picking operation, the grippers pick an article, flip the article vertically through rotation around a horizontal axis, orient the article to a proper processing orientation around a vertical axis, convey the article to a final destination, place the article at the final destination (for instance, upon a conveyor) and release the article in a stable position. Referring to FIG. 1, a standard double-rotation gripper assembly 10 is provided with a pivotable arm 12 having a suction assembly 14 at a free extent thereof for gripping an article (not shown). The article may be picked from a plurality of articles arranged in random orientations along a moving conveyance apparatus such as a conveyor belt (not shown).

The center of mass of gripper assembly 10 is maintained along a vertical axis 16 that is displaced from a vertical axis 18 along which the gripper's center of rotation is disposed. The displacement of the gripper assembly's center of mass relative to its center of rotation contributes heavily to vibratory disturbance due to inertial effects, and thereby decreases the mean time between failures (MTBF) of the overall system. In addition, pivotable arm 12 requires an extended time to stabilize the article vibrations during the robot trajectory, thereby escalating the time increments required to effect proper orientation of articles from their original orientation. The industry standard gripper configuration further includes many interacting parts that require significant investments of time and money for installation, operation and maintenance. In order to improve the speed of reorientation tasks, cooperation by multiple robot pickers is often employed, in which case these factors negatively affect the ability to execute predictable picking operations for multiple installations. Where handling of articles is carried out over long periods of time, all of the aforementioned factors contribute to excess MTBF and further reduce the productivity and reliability of entire production systems.

Another way to increase the overall speed of a system is to implement a multiple gripper (such as multiple suction cups) on the end-effector of a robot. Such multiple grippers can grasp several articles simultaneously from the article picking position to pick-up and place two or more articles at the same time. This solution, however, not only increases the weight of the gripper, but also increases the complexity (and therefore the associated cost, operability and maintainability) of the device, and especially constrains use of the gripper to only a few specific article shapes. The increase in changeover time between different articles effectively diminishes the flexibility of the overall system and defeats any benefit attributable to production speed realized by the multiple gripper configuration.

The search for improved grippers for moving devices has, therefore, continued.

SUMMARY OF THE INVENTION

A gripper assembly for use with a moving device is disclosed. In one embodiment, the gripper assembly comprises:

a platform with an upper surface and an opposed lower surface;

an elongate arm comprising at least one elongate member joined to and extending from the platform, wherein each elongate member has a body, and each body comprises a proximal end adjacent the platform and an opposed distal end;

a gripping mechanism rotatably supported relative to the arm wherein the gripping mechanism includes a holder comprising a pivoting arm pivotably joined to the body in the region of the distal end of the body; and an actuator in operable communication with the pivoting arm so as to impart pivotable movement to the pivoting arm and rotational motion to the gripping mechanism about a horizontal axis upon actuation of the actuator, wherein the actuator may be disposed relative to the body so as to be pivotably movable relative to the arm;

wherein the gripper assembly has a center of mass substantially aligned with a vertical axis of rotation of the gripper assembly during actuation of the actuator.

The gripper assembly can be adjusted in an efficient manner and has enough versatility to be utilized in a number of different environments with minimum changeover time. The gripper assembly places the center of gravity more close to the axis of rotation, thereby addressing the drawbacks of known grippers, and yet remains economical to manufacture, install and use for long-term operations requiring predictability and reliability, even in case of frequent article changes.

DETAILED DESCRIPTION OF THE INVENTION

The invention is directed to a gripper assembly for use with a moving device, such as a mechanical device. The moving device may be any suitable device that is capable of moving articles. Mechanical devices include, but are not limited to pneumatic arms, robots, and other mechanical moving elements. The mechanical device may be actuated in any suitable manner including, but not limited to: mechanically, electrically, and combinations thereof, and is not limited to devices that are mechanically actuated. Although the present application describes the mechanical device in the context of a robot, the present invention is not limited to use with a robot, and it should be understood that the term "robot" may be replaced with the terms "moving device" or "mechanical device".

In certain embodiments, the gripper assembly is used for picking and placing articles such as containers (which may be empty, or at least partially filled), devices and other objects (which are referred to herein as an "article" or collectively as "articles"). In some cases, the articles are picked from a conveyance device and placed for subsequent treatment thereof at one or more treatment stations along a production line. Such treatment stations include but are not limited to stations for labeling, filling, capping and sealing the articles, which stations can electively treat the properly positioned articles in succession for eventual delivery from the manufacturing site. The gripper assembly is not limited to such a use, and can be used for any other purposes for which gripper assemblies are generally used.

In certain embodiments, the gripper assembly maintains the gripper assembly's center of mass substantially aligned with a vertical rotation axis while the gripper assembly moves an article between an initial article picking position, in which the gripper assembly engages the article (which may be in a random orientation), and a successive article placement position, in which the gripper assembly rotates a picked article around a horizontal axis for eventual placement (such as in a stable conveyable position for subsequent treatment). The term "substantially aligned", as used herein, refers to relationships in which the distance between the gripper assembly's center of mass and vertical rotation axis is less than or equal to about 25 mm. Thus, the term "substantially aligned" includes relationships in which the distance between the gripper assembly's center of mass and vertical rotation axis is less than or equal to about 25 mm, 20 mm, 15 mm, 10 mm, 5 mm, as well as those in which the center of mass and the vertical rotation axis coincide (the center of mass is maintained along the vertical rotation axis).

Figure 2:
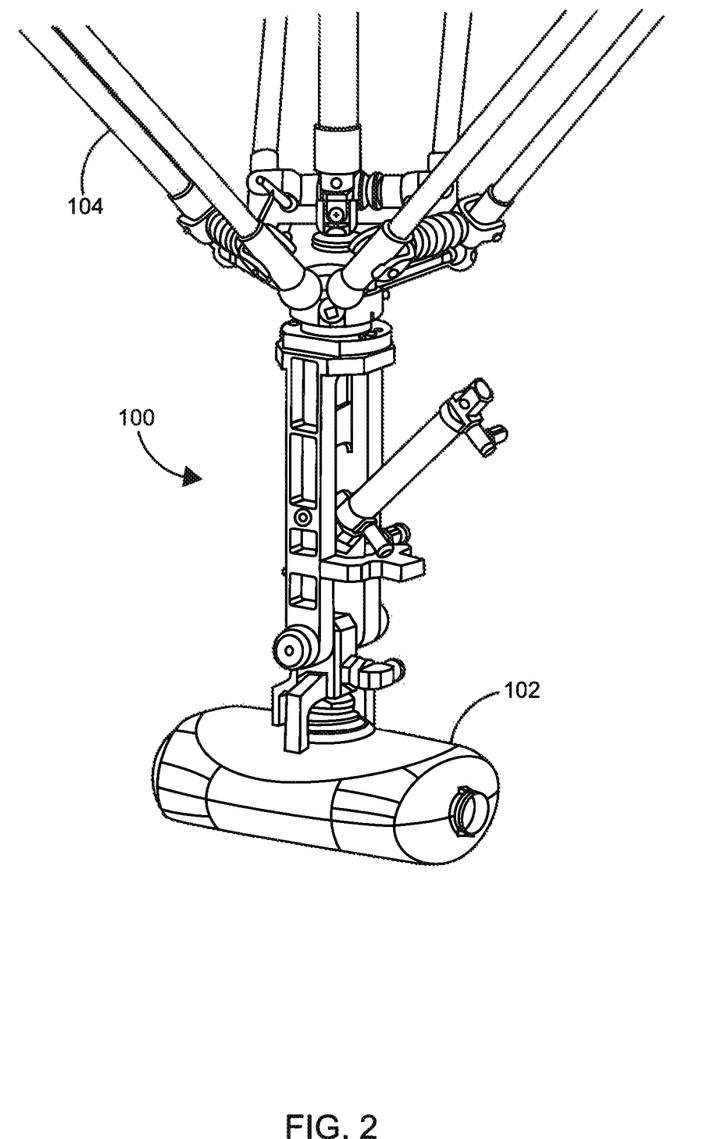
FIG. 2 is a perspective view of a gripper assembly mounted on a robotic platform.

Now referring to the figures, wherein like numbers represent like elements, a gripper assembly 100 is shown in FIG. 2 gripping an exemplary article 102, although multiple article geometries are amenable to successful practice of the invention. Gripper assembly 100 is mounted on the platform of a robot 104 that effects translation of gripper assembly 100 through a three-dimensional space and rotation of the gripper assembly around a vertical rotation axis. Robot 104 may be selected from a variety of commercially available robots and actuating arms, including but not limited to parallel kinematics robots, Spider and Delta robots, six-axis robots, SCARA robots and independently actuatable automatic arms. As illustrated, robot 104 employs independent control arms that extend from a base element and are attached to a movable element to position and orient the movable element in three-dimensional space. The configuration of the robot 104 shown is well known in industrial processing. The selection of robot is not limited to such configuration, and alternative robotic configurations are amenable for use with the gripper. Gripper assembly 100 is rotatably attached to the robot's movable element around the vertical rotation axis such that the gripper assembly and the movable element have a common rotational axis.

Figure 3:
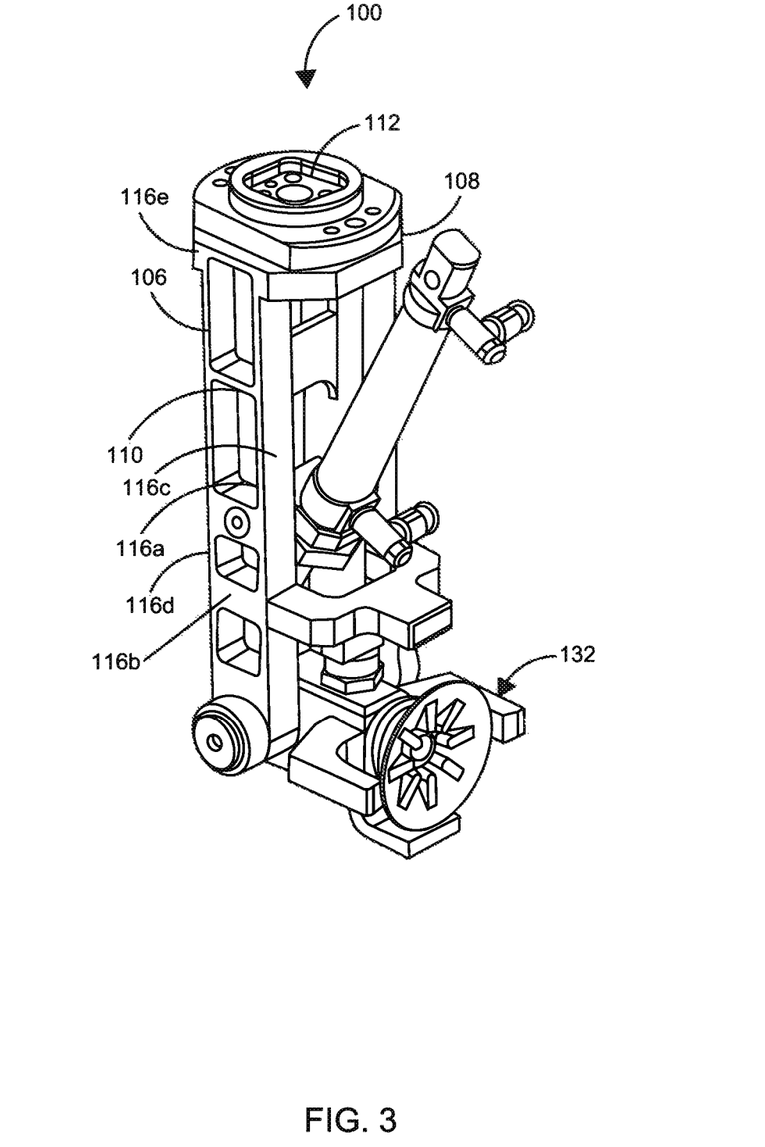
FIG. 3 is a perspective view of the gripper assembly of FIG. 2 apart from a robotic platform.
Figure 4:
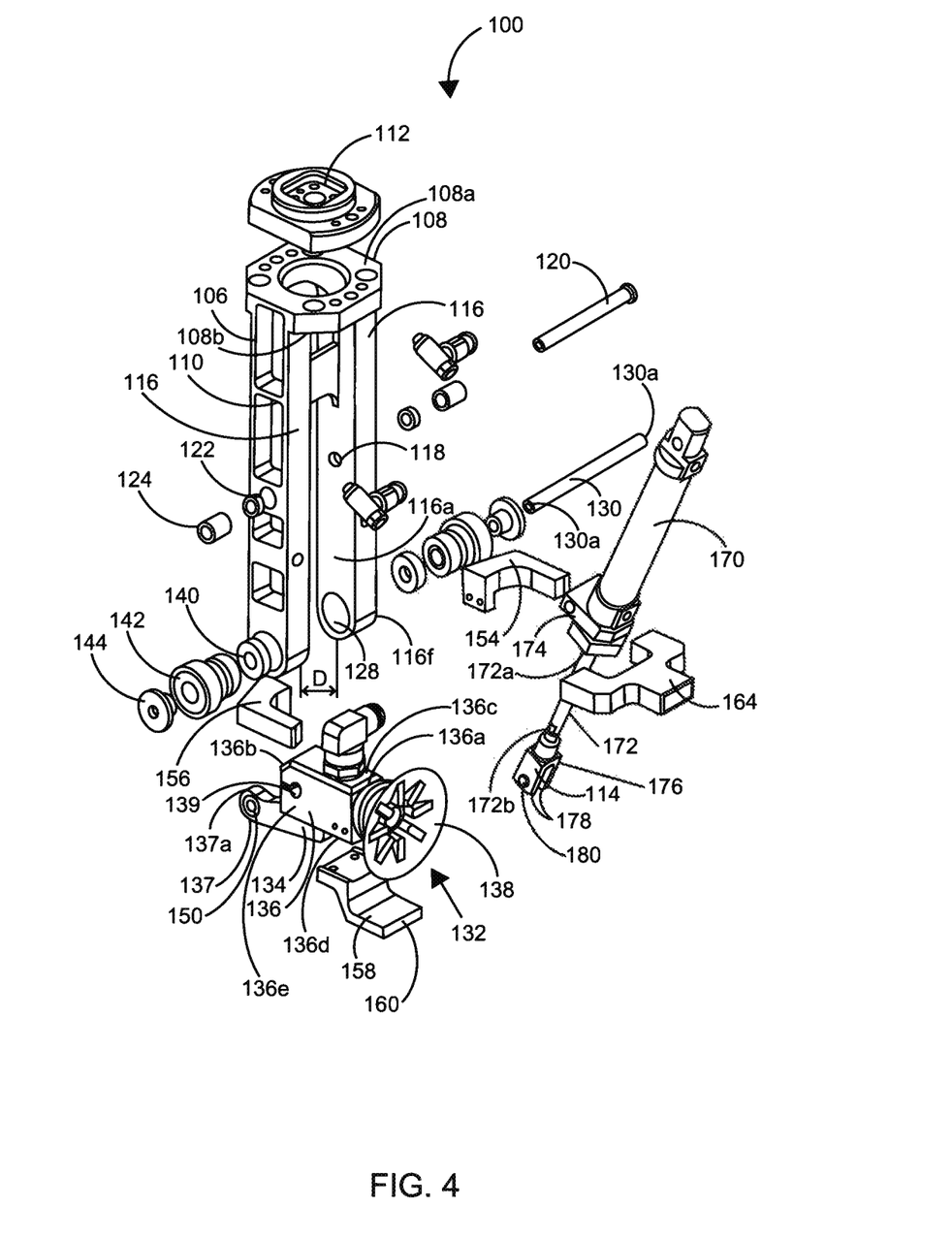
FIG. 4 is an exploded view of the gripper assembly of FIG. 3.

Referring further to FIGS. 3 and 4, gripper assembly 100 is illustrated in more detail. Gripper assembly 100 comprises an elongate arm 106 and a platform 108. The elongate arm 106 comprises at least one elongate member 110. Platform 108 has an upper surface 108a and an opposed lower surface 108b. One or both surfaces may (but need not) be planar. The upper and lower surfaces have a thickness therebetween. The upper surface 108a of platform 108 may support an interchangeable adapter 112 which may be in threaded engagement (or detachably affixed in another manner) with at least one of platform 108 and robot 104 such that robot 104 imparts translational and rotational motion to gripper assembly 100 while the robot is in operation. The adapter 112 can be of any configuration that accommodates connection of gripper assembly 100 with a corresponding robotic means or other mechanical device. The adapter 112 may be of a universal type that can be connected to mechanical devices with different configurations. The ability to switch adapter configurations with gripper assembly 100 is an advantage that permits interchangeability of gripper assembly 100 with a variety of robotic installations. Gripper assembly 100 thereby renders flexibility not only in the types of articles being picked and placed but also in the variety of tasks that can be performed in production lines across multiple industries.

At least one elongate member 110 extends from the platform 108, such as from the lower surface 108b (or other portion) of the platform. The elongate member(s) 110 may extend from the surface of the platform normally (at a right angle), or it may extend at some other suitable angle relative to the platform 108, such as generally normal to the platform 108. As used herein, the term "generally normal" includes angles that are within about 25° of normal. Each elongate member comprises a body 116 with a length l. As shown herein, a pair of elongate members 110 is shown depending normally from the platform generally in parallel relative to one another. It is understood, however, that arm 106 can have a single elongate member, a pair of elongate members, or three or more elongate members without departing from the scope of the invention. In the embodiment shown, each member body 116 includes an inner surface 116a spaced apart from an adjacent member inner surface 116a by a distance D, an outer surface 116b, a front surface 116c, and a rear surface 116d.

The elongate member 110 may have an actuator 170 joined thereto, for example, pivotably connected thereto. The actuator 170 can be pivotably connected to the elongate member 110 in any suitable matter. One non-limiting type of pivotable connection is described in the paragraphs that follow. At or about mid-length along each body 116 is a cylindrical shaft bore 118. When there are two or more elongate members, shaft bores 118 are positioned coaxially relative to one another to accommodate insertion of a shaft 120 therethrough such that shaft 120 traverses distance D. One or both of a distance ring 122 and a bushing 124 may be selectively disposed adjacent each outer surface 116b of each body 116 such that shaft 120 passes therethrough, whereby distance ring 122 can accommodate cylinder shafts of varying lengths while bushing 124 reduces vibrations imparted to elongate arm 106 during operation of gripper assembly 100.

Each member body 116 further includes a proximal end (or "platform extent") 116e adjacent lower surface 108b of the platform 108 and an opposed distal end (which may be in the form of a cantilever extent) 116f. In the embodiment shown, the distal end 116f has a cylindrical bearing bore 128 therethrough. Bearing bores 128 are positioned coaxially relative to one another to accommodate insertion of a bearing shaft 130 therethrough such that bearing shaft 130 traverses distance D. Bearing shaft 130 supports a gripping mechanism such as a suction cup assembly 132 in rotatable motion relative to elongate arm 106.

Suction cup assembly 132 may include a holder 134 having a suction cup base 136 with a support surface 136a, an engagement surface 136b, a top surface 136c having an optional male stud screw coupling depending normally therefrom, a bottom surface 136d and a pair of side surfaces 136e. Support surface 136a carries a suction head 138 thereon. Engagement of suction head 138 with support surface 136a may be effected by frictional engagement, threaded engagement, epoxy or any other means as is known in the art. Support surface 136a opposes engagement surface 136b at which base 136 engages bearing shaft 130 via insertion of bearing shaft 130 through a support bore 139 provided through base 136 near the engagement surface. One or both of a distance disk 140 and a bearing 142 may be selectively disposed adjacent each outer surface 116b of each body 116 such that bearing shaft 130 passes therethrough, whereby distance disk 140 can accommodate cylinder shafts of varying lengths while bearing 142 provides a low friction bearing surface and further inhibits vibrations imparted to elongate arm 106 during operation of gripper assembly 100. An optional end cap 144 may be disposed at each terminal extent 130a of bearing shaft 130 to facilitate alignment of bearing shaft 130, distance disks 140 and bearing 142 during operation of gripper assembly 100.

Along bottom surface 136d of base 136 is a cantilevered pivoting arm 137 depending outwardly therefrom. Pivoting arm 137 is positioned adjacent engagement surface 136b and terminates in a pivoting extent 137a having a pivoting bore 150 therein. A plain bearing (not shown) may be disposed in pivoting bore 150 to provide a low-friction bearing surface. Pivoting arm 137 may be integral with holder 134 and/or base 136 or detachably affixed thereto. Rotation of the suction cup assembly 132, thus, imparts generally simultaneous movement to both base 136 and pivoting arm 137.

A frame comprising supports 156 and clutch 158 is selectively positioned relative to suction head 138 such that the suction head is disposed between supports 156. Clutch 158 includes retention means such as a flange (not shown) for fastening of the clutch to base 136 along bottom surface 136d of base 136 and a seat 160 that accommodates disposition of suction head 138 thereadjacent. An adapter 164 may also be provided along a length of member bodies 116 adjacent front surfaces 116c thereof intermediate suction cup assembly 132 and an actuating element (further described below).

Gripper assembly 100 further includes an actuator to establish pivotable communication with pivoting arm 137 and thereby impart rotational motion to suction cup assembly 132. As further shown in FIGS. 3 and 4, an actuator is provided in the configuration of a pneumatic cylinder 170 (which may be selected from one of several commercially available pneumatic actuators). Although pneumatic cylinder 170 is depicted as an exemplary actuator, it is understood that one or more alternative actuators can be substituted therefore, including electronic and mechanical actuation devices as are known in the art. The actuator 170 can be disposed relative to the body or bodies 116 so as to be pivotably movable relative to elongate arm 106. In the embodiment shown, the actuator 170 is at least partially disposed between the inner surfaces 116a of member bodies 116.

A linkage member 172 operably coupled to pneumatic cylinder 170 has a coupled extent 172a proximate a yoke 174 and a free extent 172b with an engagement element thereon. An exemplary engagement element is shown as a fork head 176 having a pair of tines 178 wherein each tine 178 has a fastening bore 180 defined therethrough. Fastening bores 180 are in coaxial alignment with one another such that fastening bores 180 are in registry with pivoting bore 150 when pivoting arm 137 is disposed between tines 178. Fastening bores 180 accommodate engagement of at least one fastening member with tines 178, such as by frictional engagement, complementary threaded engagement between a threaded fastening member and corresponding threads defined in fastening bores 180 or any other types of engagement known in the art.

As readily seen in the figures, suction cup assembly 132 is mounted on pivoting arm 137 to effect rotation about a horizontal axis upon actuation of pneumatic cylinder 170. The position of pneumatic cylinder 170 ensures that all masses are concentrated in substantial correspondence of the axis of rotation of gripper assembly 100 (that is, the center of rotation and the center of mass of gripper assembly 100 may be disposed along substantially aligned axes and maintained in such a relationship during actuation of pneumatic cylinder 170 and resultant rotation of suction cup assembly 132). Such configuration substantially reduces vibratory disturbances realized along elongate arm 106 and also avoids any collisions between pneumatic cylinder 170 and the picked article.

Gripper assembly 100 is further shown during operation between an initial article picking position (described with reference to FIGS. 5 and 5A) and a successive article placement position (described with reference to FIGS. 6 and 6A). In the initial article picking position shown in FIGS. 5 and 5A, gripper assembly 100 is shown as having a center of gravity disposed near or along a vertical rotation axis Y. Pneumatic cylinder 170 is disposed at an initial angle θ relative to the rotation axis, at which angle suction head assembly 132 disposes suction head 138 along a horizontal plane. In this configuration, suction head 138 is positioned in an initial article picking position for ready engagement with one or more articles in succession as directed by robot 104.

Figure 6:
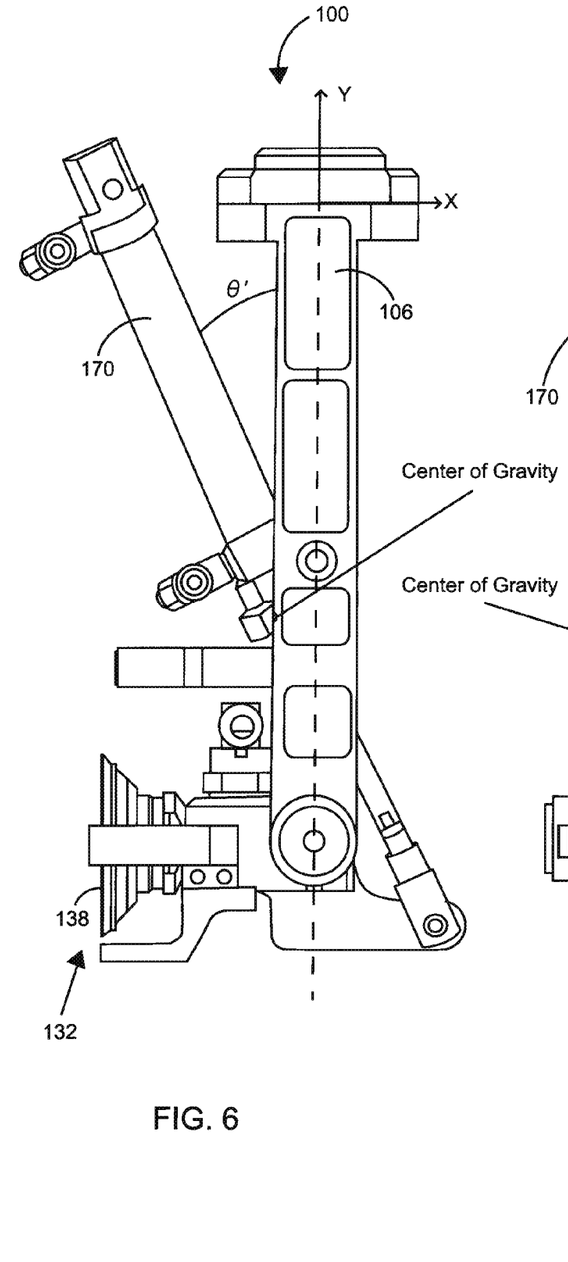
FIG. 6 is a front and side view of the gripper assembly in a subsequent article rotation position.
Figure 6A:
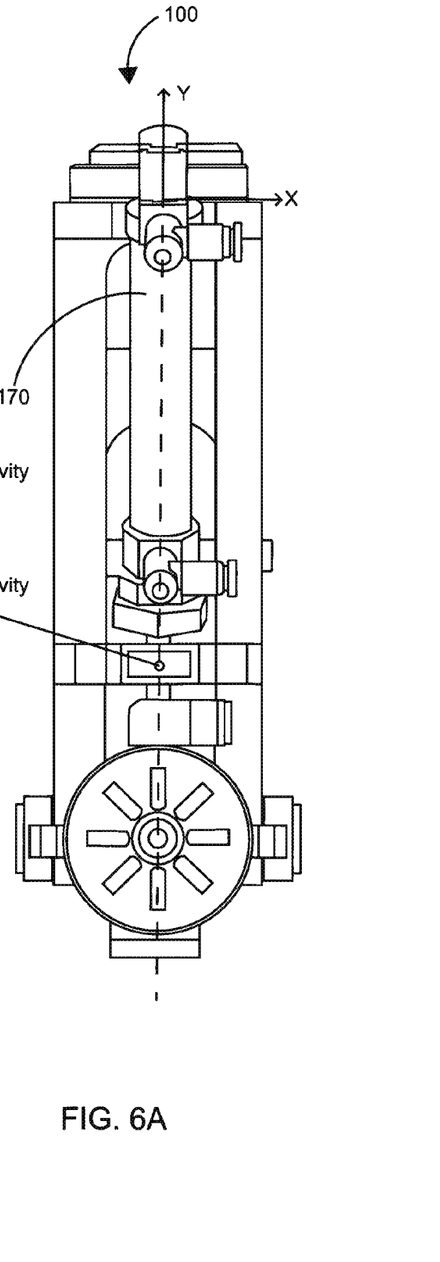
FIG. 6A is a side view of the gripper assembly in a subsequent article rotation position.

Upon actuation of pneumatic cylinder 170 to the successive article rotation position as shown in FIGS. 6 and 6A, pneumatic cylinder 172 pivots toward front surfaces 116c of member bodies 116 so as to approach a subsequent angle θ'. As a consequence of angular displacement of pneumatic cylinder 170, linkage member 172 coupled thereto imparts rotational motion to pivoting arm 137 such that suction head assembly 132 rotates generally through a 90° path to an article placement position (e.g., suction head 138 is disposed in a generally vertical plane or in any plane defined along the angular path between the article picking position defined at angle θ and the article placement position defined at angle θ'). Throughout rotational movement of suction cup assembly 132 along bearing shaft 130, suction head 138 retains engagement with the picked article so as to orient the picked article to an article placement position via rotation of the picked article around a horizontal axis. In this successive position, the center of mass of gripper assembly 100 is substantially aligned with the gripper assembly's vertical rotation axis even though the horizontal axis positioning of the centers of mass and rotation changes between the initial article picking position and the successive article rotation position. Vibratory disturbance along elongate arm 106 is thereby ameliorated throughout operation of gripper assembly 100.

EXAMPLE 1

A first gripper assembly is obtained in the form of the industry standard shown and described above with respect to FIG. 1. The gripper picks up a bottle having a mass of 0.15 kg and width of 130 mm. The overall mass of the gripper is 1.20 kg. The axis of rotation is offset from the axis along which the gripper's center of mass is disposed by a distance of 90 mm.

Inertia/Force on Bottle:

$r$=width of bottle/2=65 mm $J_{bottle}=½\, mr^2=316.88\, kg/mm^2$

Inertia on robot for rotation movement:

$r$=90 mm $J_{Gripper}=m*r^2=9720\, kg/mm2$ $J_{Gripper}+J_{Bottle}=10036.88\, kg/mm^2$ Thus, high flipping inertia is realized by the bottle.

EXAMPLE 2

Figures 5, 5A:
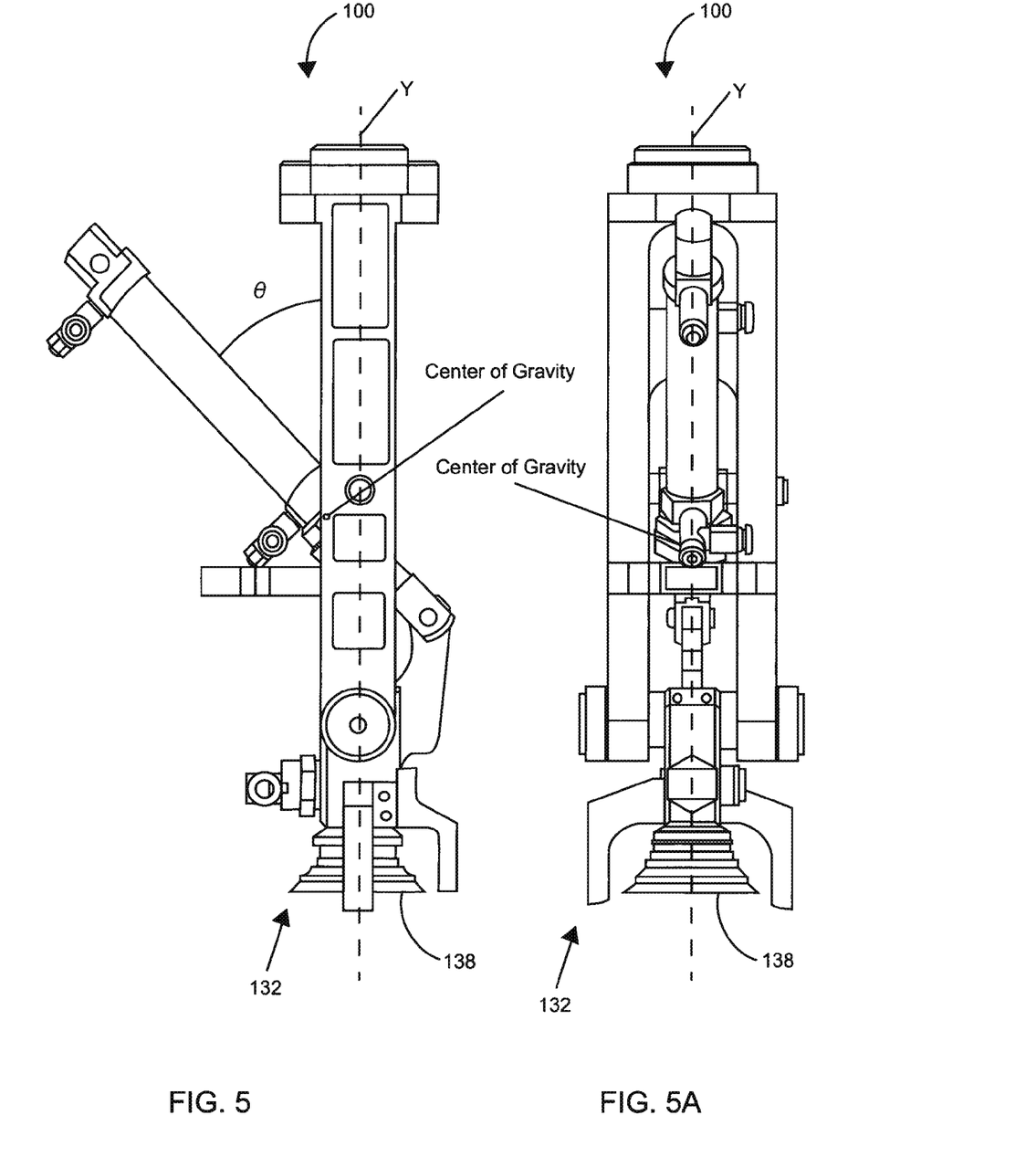
FIG. 5 is a side view of the gripper assembly in an initial article picking position.
FIG. 5A is a front view of the gripper assembly in an initial article picking position.

A second gripper assembly is constructed as shown and described with reference to FIGS. 2 to 4 herein. The gripper is in an initial article picking position as shown in FIGS. 5 and 5A when the gripper picks up a bottle having a mass of 0.15 kg.

Center of gravity:

$X$=−2.6 mm $Y$=−106.4 mm $Z$=−29 mm

Inertia of rotation around Y-axis:

$J_Y$=883.9 kg/mm$^2$

EXAMPLE 3

A third gripper assembly is constructed according as shown and described with reference to FIGS. 2 to 4 herein. The gripper is in a successive article rotation position as shown in FIGS. 6 and 6A when the gripper engages a picked bottle having a mass of 0.15 kg.

Center of gravity:

$X$=−3.9 mm $Y$=−106.2 mm $Z$=−29 mm

Inertia of rotation around Y-axis:

$J_Y$=783.4 kg/mm$^2$

The disclosed gripper assembly is capable of performing all of the activities of industry standard gripper assemblies with optimal MTBF. That is, the gripper assembly achieves article picking via a vacuum means, flipping of the picked article via rotation around a horizontal axis, orientation of the article via rotation around a vertical axis, movement of the article to a final destination for placement into a carrier or upon a conveyance device and release of the picked article in a stable, conveyable position for further treatment. The gripper design shown herein minimizes material utilization and thereby makes the configuration amenable to lightweight but rigid materials such as aluminum (although other fabrication materials are contemplated, including but not limited to the group of materials comprising metals, reinforced plastics and composites). Selection of such materials minimizes the weight of the gripper assembly without compromising the effectiveness of gripper activity in operation. Engagement among all critical components is effected so as to ensure high stiffness of the gripper assembly throughout operation.

The disclosed gripper assembly realizes minimum rotational inertia, minimum translational inertia, minimum flipping inertia in a fast-flipping mechanism that maintains high speed and enhanced reliability. With these characteristics, the gripper assembly exhibits enhanced flexibility in the accommodation of articles of numerous sizes, shapes, textures, contours and material compositions and which are fabricated according to a variety of production techniques (including but not limited to injection molding, extrusion, blow-molding and complementary and other known production techniques as are known in the art for producing articles of manufacture). The attenuation of maintenance time attributable to changeover in gripper assembly configurations contributes to the successful operation of the disclosed gripper assembly and the reduction in the number of present invention gripper assemblies that are required on any one assembly line. With significantly increased MTBF, regular maintenance may be thereby reduced and the number of robots required in any given installation may also be reduced as the current gripper design realizes higher pick and place rates relative to the industry standard configuration.

The term "joined to" encompasses configurations in which an element is directly secured to another element by affixing the element directly to the other element; configurations in which the element is indirectly secured to the other element by affixing the element to intermediate member(s) which in turn are affixed to the other element; and configurations in which one element is integral with another element, i.e., one element is essentially part of the other element. The term "joined to" encompasses configurations in which an element is secured to another element at selected locations, as well as configurations in which an element is completely secured to another element across the entire surface of one of the elements.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross-referenced or related patent or application is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A gripper assembly for use with a moving device, said gripper assembly comprising:
   a platform with an upper surface and an opposed lower surface;
   an elongate arm comprising at least one elongate member joined to and extending from said platform, wherein each elongate member has a body, and each body comprises a proximal end adjacent said platform and an opposed distal end;
   a gripping mechanism rotatably supported relative to said elongate arm wherein said gripping mechanism includes a holder comprising a pivoting arm pivotably joined to said body at or adjacent to the distal end of said body; and
   an actuator in operable communication with said pivoting arm so as to impart pivotable movement to said pivoting arm and rotational motion to said gripping mechanism about a horizontal axis upon actuation of said actuator;
   wherein said gripper assembly has a center of mass substantially aligned with a vertical axis of rotation of said gripper assembly during actuation of said actuator.

2. The gripper assembly of claim 1 wherein said elongate arm extends generally normally relative to said platform.

3. The gripper assembly of claim 2 wherein said elongate arm includes at least a pair of elongate members extending from said platform, with each said body having an inner surface spaced apart from any adjacent inner surface.

4. The gripper assembly of claim 3 wherein at least a portion of said actuator is disposed between said elongate members.

5. The gripper assembly of claim 4 wherein each body has a bearing bore formed therein to accommodate insertion of a bearing shaft, wherein said gripping mechanism is rotatable relative to said arm and supported by said bearing shaft, wherein said holder of said gripping mechanism has a support bore therein to accommodate insertion of said bearing shaft therethrough, and said pivoting arm depends outwardly from said holder and has a pivoting bore therein.

6. The gripper assembly of claim 5 further comprising a linkage member having a coupled extent operably coupled with said actuator and a free extent with an engagement element thereon for operable engagement with said gripping mechanism.

7. The gripper assembly of claim 1 wherein said actuator is disposed relative to said body so as to be pivotably movable relative to said arm.

8. The gripper assembly of claim 1 wherein said actuator comprises a pneumatic cylinder.

9. The gripper assembly of claim 1 wherein said gripping mechanism comprises suction cup assembly.

10. A gripper assembly of claim 1 for use in conjunction with a robot wherein said gripper assembly is rotatably mounted on the robot, and said robot effects translation of said gripper assembly on a horizontal plane and rotation of said gripper assembly around said vertical rotation axis.

11. A The gripper assembly of claim 10 wherein said platform supports an interchangeable adapter in engagement with the robot.

* * * * *